US007933784B2

(12) United States Patent
Brocci (10) Patent No.: US 7,933,784 B2
(45) Date of Patent: Apr. 26, 2011

(54) METHOD AND APPARATUS FOR AUTOMATING MULTI-NATIONAL INSURANCE INFORMATION REQUESTS

(75) Inventor: Caroldean Brocci, Spring Lake, MI (US)

(73) Assignee: SPX Corporation, Charlotte, NC (US)

( * ) Notice: Subject to any disclaimer, the term of this patent is extended or adjusted under 35 U.S.C. 154(b) by 1445 days.

(21) Appl. No.: 10/390,037

(22) Filed: Mar. 18, 2003

(65) Prior Publication Data

US 2004/0186748 A1 Sep. 23, 2004

(51) Int. Cl.
*G06Q 40/00* (2006.01)
(52) U.S. Cl. .............................................................. 705/4
(58) Field of Classification Search .................. 705/2–4
See application file for complete search history.

(56) References Cited

U.S. PATENT DOCUMENTS

| | | | | |
|---|---|---|---|---|
| 5,627,973 A | * | 5/1997 | Armstrong et al. | 705/10 |
| 5,765,138 A | * | 6/1998 | Aycock et al. | 705/7 |
| 5,903,882 A | * | 5/1999 | Asay et al. | 705/44 |
| 6,460,020 B1 | * | 10/2002 | Pool et al. | 705/26 |
| 6,647,374 B2 | | 11/2003 | Kansal | 705/37 |
| 7,047,219 B1 | * | 5/2006 | Martin et al. | 705/37 |
| 7,069,234 B1 | * | 6/2006 | Cornelius et al. | 705/26 |
| 7,167,844 B1 | * | 1/2007 | Leong et al. | 705/80 |
| 2002/0010665 A1 | * | 1/2002 | Lefebvre et al. | 705/31 |
| 2002/0022976 A1 | * | 2/2002 | Hartigan | 705/4 |
| 2002/0049622 A1 | * | 4/2002 | Lettich et al. | 705/7 |
| 2002/0069079 A1 | * | 6/2002 | Vega | 705/1 |
| 2002/0087368 A1 | * | 7/2002 | Jin et al. | 705/7 |
| 2003/0101106 A1 | * | 5/2003 | Mizushima et al. | 705/28 |
| 2003/0115129 A1 | * | 6/2003 | Feaver et al. | 705/37 |
| 2003/0126048 A1 | * | 7/2003 | Hollar et al. | 705/30 |
| 2003/0171962 A1 | * | 9/2003 | Hirth et al. | 705/7 |
| 2003/0195824 A1 | * | 10/2003 | Duffy et al. | 705/26 |
| 2004/0139001 A1 | * | 7/2004 | Henriques et al. | 705/39 |
| 2005/0177435 A1 | * | 8/2005 | Lidow | 705/22 |

OTHER PUBLICATIONS

Land (2006) In Collins Dictionary of Law. WJ Stewart, 2006.*
Gilfillan, Ian, "Introduction to Relational Databases" Database Journal web page, Jun. 2002.*
Periculum Services Group (PSG), "Introductory Information" Oct. 2002.*
Periculum Services Group (PSG), Report Samples Apr. 2002.*
Periculum Services Group (PSG), Home Page—Nov. 2002.*
Ins-Cert.com, Web Pages "Internet Insurance Certificate Management System" Nov. 2001.*
PeopleSofte, PeopleSofte 8-4 Product Configurator 2002.*
Navision Attain Overview 3.6, 2002.*
WestLaw International Content List, Mar. 12, 2001.*
Periculum Services Group, "Periculum Software Tames the Certificate of Insurance Monster," Apr. 7, 1999, http://www.periculum.com/ann_sw.asp, p. 1.
Periculum Services Group, "About Periculum—Frequently Asked Questions," http://www.periculum.com/faq.asp, pp. 1-3.
Periculum Services Group, "Periculum Is International," http://www.periculum.com/ann_international.asp, p. 1.

* cited by examiner

*Primary Examiner* — Neal R Sereboff
(74) *Attorney, Agent, or Firm* — Baker & Hostetler LLP (57) ABSTRACT

An apparatus, method, and computer program product for maintaining data regarding the compliance of vendors with insurance requirements of a number of nations.

18 Claims, 7 Drawing Sheets

FIG. 1

```
type Vendor {
    string Name;
    list ThingPurchased Purchased;
    list InsurancePolicy Policies;
    Nation PrinciplePlaceofBusiness;
    list Nation Locations;}
```

- 10
- 12 string Name;
- 14 list ThingPurchased Purchased;
- 24 list InsurancePolicy Policies;
- 40 Nation PrinciplePlaceofBusiness;
- 42 list Nation Locations;}

```
type ThingPurchased {
    string Name;
    int Type;
    list Product Prods;}
```

- 16
- 18 string Name;
- 20 int Type;
- 22 list Product Prods;}

```
type InsurancePolicy{
    string Carrier;
    int Type;
    float CoverageAmount;
    date PolicyStart;
    date PolicyEnd;
    list Nation NationsCovered;}
```

- 26
- 28 string Carrier;
- 30 int Type;
- 32 float CoverageAmount;
- 34 date PolicyStart;
- 36 date PolicyEnd;
- 38 list Nation NationsCovered;}

FIG. 2

```
type Nation {
    string Name;
    list string Languages;
    InsurancePolicy minProductsLiability;
    InsurancePolicy minGeneralLiability;
    InsurancePolicy minAutomobileLiability;}
```

FIG. 3

```
type Product {
    string Name;
    list Nation NationsDistributed;
    string Division; }
```

METHOD AND APPARATUS FOR AUTOMATING MULTI-NATIONAL INSURANCE INFORMATION REQUESTS

FIELD OF INVENTION

This invention relates to computers. More specifically, this invention relates to automating processes related to insurance information.

BACKGROUND OF THE INVENTION

A person or company that produces or sells products of any kind must worry about liability. Under the laws of most nations, producers of products are liable to the users and purchasers of those products, and, in many cases, their families and other users, associates and bystanders. Under many products liability regimes, the seller, or manufacturer of a product may be held liable, despite their lack of fault, and despite fault on the part of third parties that contributed to the characteristic of the product that gave rise to the liability. A typical manufactured product contains parts manufactured and sold by a number of parties, and is produced by machinery supplied by a number of parties. The services of yet another large number of parties are typically used in the production of many, if not most manufactured products.

Any or all of these parties could supply defective component parts, defective machinery, or engage in negligence while performing their services, all of which could expose the ultimate manufacturer to liability due to alleged manufacturing defects, design defects or insufficient warnings allegations by the product's users, purchasers, their families, other associates and bystanders. To combat the possibility of liability, manufacturers sign indemnification agreements with their suppliers and service providers ("vendors"). However, an indemnification agreement is useless if the vendor has no financial resources with which to pay the contractual indemnification.

Similarly, manufacturers and other businesses enter into relationships with a number of vendors whose services or products do not directly comprise a manufactured product, but whose services or products can nevertheless expose the manufacturer to various types of liability. These vendors can include couriers, transportation providers, landlords, and any other vendor who conducts business on behalf of the purchasing business, or whose actions can otherwise subject the purchaser to liability to third parties. In these relationships, purchasers often require indemnification. However, as in the above example, indemnification is worthless without a solvent source of money in the event of a judgment.

The prospect of judgment-proof vendors and worthless indemnification clauses leads manufacturers and other purchasers of vendor services (hereinafter "manufacturers") to require that their vendors carry certain levels of general liability, products liability, and automobile liability insurance. Thus, in the event that a judgment is levied against the manufacturer, for which the manufacturer has an indemnification claim against the vendor, the manufacturer will have a solvent source of indemnification, in the form of the vendor's insurance policy.

A large manufacturer can have relationships with hundreds of vendors, providing a wide variety of goods and services. For each vendor, the manufacturer must decide which types of insurance the vendor must carry, and at what levels. Also, because insurance policies, by their nature, must be periodically renewed, the manufacturer must periodically contact the vendor, to make sure the vendor maintains the appropriate types and levels of insurance coverage. To standardize this process, ACORD Corporation has developed a number of forms with which manufacturers and vendors have become familiar. The ACORD forms evidence limits of various types of insurance, the name of the insurance company, the applicable insurance policy numbers, the effective dates of each policy, and other pertinent information relating to the evidenced insurance coverages. While the ACORD forms standardize the paperwork, there is still much paperwork to be done once the form is returned to the manufacturer. For example, the manufacturer must determine what types and levels of coverage are necessary for this particular vendor, and must then determine, from the form, whether the vendor has the insurance required for the continuation of the business relationship. Additionally, the manufacturer must check back with the vendor when any of the required insurance policies lapse, to make sure that the required insurance policies have been renewed. The cost of keeping current with the insurance coverages maintained by vendors can be substantial, and possibly cost prohibitive.

To automate this process a bit more, a software solution has been created. One example of this is the system that has been deployed by Periculum Services Group, of Portland, Mich. Periculum contacts the vendors in the manufacturer's name, and processes the forms received. The manufacturer is able to check on the status of individual vendors by logging into the Periculum web site, and searching for the vendor. Also, the manufacturer can give Periculum the requirements for each vendor, and Periculum can compare this information to the insurance actually carried by the vendor to determine if the vendor is in compliance with specified insurance requirements.

The Periculum system works somewhat well when the vendors are located within the United States, and the manufacturer does business solely within the United States. However, when the vendor is located outside of the United States, or the manufactured products are sold in worldwide markets, insurance requirements are complicated. Foreign countries do not have standardized forms, like the ACORD form used in the United States. Foreign law is different with respect to liability. Additionally, a domestic U.S. vendor may not know that it needs foreign insurance, because it might not be aware that its parts, machinery, or services are being used to manufacture products that are sold abroad. Currently, the only way to ensure worldwide coverage when it is needed is manual confirmation, on a vendor-by-vendor basis.

Additionally, the current system requires high level knowledge of the manufacturer's policies on the part of its staff that are interacting directly with the system. A system is needed that can automate insurance requests for international vendors, and vendors whose goods or services will be sold and used in an international setting. Additionally, a system is needed that can automate vendor insurance requests with minimal hands-on activity from those within the manufacturer company with specific insurance expertise.

SUMMARY OF THE INVENTION

The foregoing needs have been met, to a great extent, by the present invention wherein one aspect an apparatus for maintaining insurance compliance information is disclosed. The apparatus contains a means for maintaining a list of vendors, and each entry in the list contains at least one characteristic of the vendor.

The apparatus contains a means for maintaining a list of products, and each entry in the list contains a list of countries in which the product is sold. The apparatus contains a means for maintaining a list of countries, and each entry in the list contains information regarding insurance law and custom in that country. The apparatus contains a means for updating the list of vendors, a means for updating the list of products, and a means for updating the list of countries. The apparatus contains a means for determining whether each vendor in the list of vendors carries insurance appropriate for each country in the list of countries in which the products the vendor's goods or services are used in producing are sold.

In another aspect of the present invention, a method for maintaining insurance compliance information is disclosed. The method contains a step of maintaining a list of vendors, and each entry in the list contains at least one characteristic of the vendor.

The method contains a step of maintaining a list of products, and each entry in the list contains a list of countries in which the product is sold. The method contains a step of maintaining a list of countries, and each entry in the list contains information regarding insurance law and custom in that country. The method contains steps of updating the list of vendors, updating the list of products, and updating the list of countries. The method contains a step of determining whether each vendor in the list of vendors carries insurance appropriate for each country in the list of countries in which the products the vendor's goods or services are used in producing are sold.

In a third aspect of the present invention, a computer program product in a computer readable media for use in a data processing system is disclosed. The computer program product includes a readable media, and a program of instructions executable by the data processing system, stored on the readable media. The program of instructions contains a step of maintaining a list of vendors, and each entry in the list contains at least one characteristic of the vendor.

The program of instructions contains a step maintaining a list of products, and each entry in the list contains a list of countries in which the product is sold. The program of instructions contains a step of maintaining a list of countries, and each entry in the list contains information regarding insurance law and custom in that country. The program of instructions contains steps of updating the list of vendors, updating the list of products, and updating the list of countries. The program of instructions contains a step of determining whether each vendor in the list of vendors carries insurance appropriate for each country in the list of countries in which the products the vendor's goods or services are used in producing are sold.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purposes of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

DETAILED DESCRIPTION OF THE INVENTION

Figure 1:
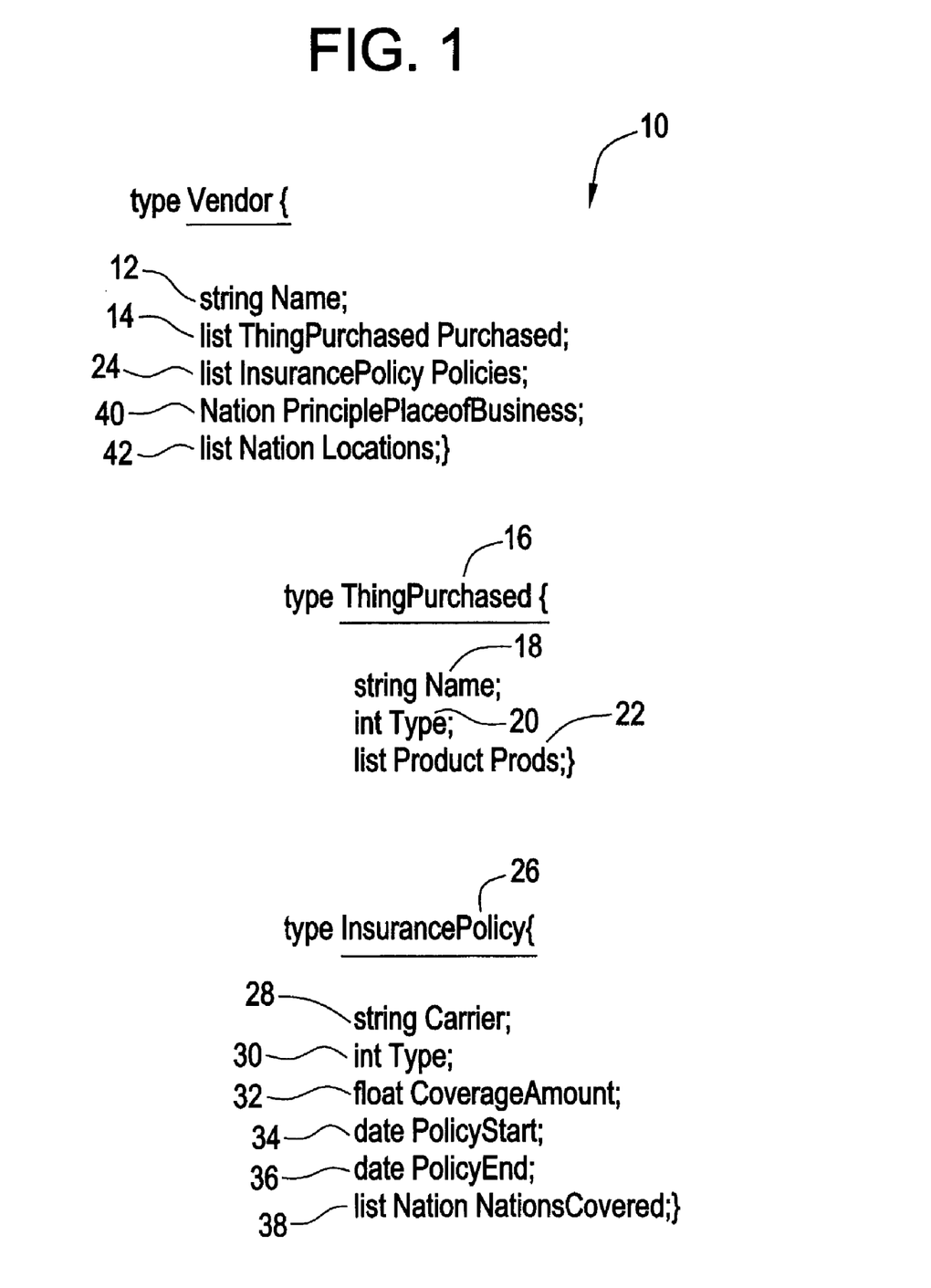
FIG. 1 is a block diagram of a data structure used in an embodiment of the present invention.

The present invention discloses a method, apparatus, and program product that is used by a manufacturer to ensure that its vendors are carrying the appropriate levels of insurance for each type of good or service the vendor provides, and for each country in which the vendor's goods or services will have an affect. Referring now to FIG. 1, a data structure 10 used in an embodiment of the present invention is shown. This data structure 10 is designed to capture the information required for each vendor, in order to determine whether that vendor is in compliance with the insurance requirements of the manufacturer. The Vendor data structure contains the vendor's name 12. The vendor's name can be stored as a string, a character array, or any other data type that can contain, display, and manipulate alphanumeric data.

The Vendor data structure contains a list of things purchased by the manufacturer 14. The list, and any other lists used in the present invention, can be any list or array format known to one of ordinary skill in the art of software engineering. Each thing purchased is stored in another data structure 16, which contains attributes of the thing purchased that may be necessary to determine the types and levels of insurance required by the user of this embodiment of the present invention. In this embodiment of the present invention, the ThingPurchased data type contains the name of the thing purchased 18, which is, like the name of the Vendor, stored as a string, a character array, or other data type capable of storing, displaying, and manipulating alphanumeric data. The ThingPurchased data type also contains a type of thing purchased 20. The manufacturer can define any number of different types of things that it can purchase from a vendor, with each type having different insurance requirements associated with it, in each relevant country. By way of example, the types of things purchased can include land or use thereof, parts, manufacturing machines, manufacturing services, and non-manufacturing services. Dividing the things purchased into these types can be useful, for example, if the manufacturer has different requirements for insurance, in a given country, for sellers of parts, and for landlords.

The ThingPurchased data type also contains a list of products with which the thing purchased is associated 22. The manufacturer or user of the program can decide what it means to be "associated" with a product, but generally, associated can mean that the thing purchased is associated enough with the product that the vendor providing the thing purchased must comply with the insurance requirements for that type of thing provided, for the countries in which that product is sold. The list of products can be a pointer to a record in the Products data structure 56, which will be discussed below.

The Vendor data structure also contains a list of insurance policies carried by the vendor 24. This list can be used by the manufacturer to track the vendor's insurance coverage, and the system can compare the vendor's coverage to the coverage required in the nations where the vendor was required to carry insurance. In this embodiment of the present invention, the insurance policy has its own data type 26, which contains all of the information necessary to compare the vendor's insurance to the insurance required in each country where the manufacturer requires the vendor to carry insurance.

The InsurancePolicy data type contains the name of the carrier of the policy 28, which is stored as a string, character array, or any other data type that can store, display, and manipulate alphanumeric data. The InsurancePolicy datatype also contains a value for the type of insurance 30, which can be stored as an integer, or a string, or any other data type. The manufacturer can define a value for each type of insurance policy of which the manufacturer wants to keep track. Examples of insurance types are general liability, products liability, and automobile liability. The InsurancePolicy data type contains an entry for the amount of the insurance coverage 32, which can be stored as a floating point number or any other numerical data type that can represent decimal numbers. The InsurancePolicy data type also contains the start date of the insurance policy 34, and the end date of the policy 36, stored as an integer or any other data type capable of storing dates. The InsurancePolicy data type also contains a list of the nations covered under the insurance policy 38. The nations will be stored using the Nation data type, 44 which will be described below. Additionally, the InsurancePolicy data type can contain any other data that would be useful either in determining whether the vendor is in compliance, or would be useful if the manufacturer were to view the information. Examples of data members not shown include per-incident coverage information, and deductible information.

The Vendor data structure also contains a nation where the vendor has it principal place of business 40, and a list of other nations in which the vendor has places of business 42. The nations can be stored as pointers to items in the list of nations, described below. This information is useful if the manufacturer requires a vendor to carry insurance in its home country, in addition to the nations where the manufacturer does business using the things purchased from the vendor. This information is also useful to allow the manufacturer to initiate contact with vendor in the vendor's native language, and with the insurance customs of the vendor's native country. The ability to initiate contact in the native language, with the appropriate customs, makes compliance on the part of the vendor much easier.

Figure 2:
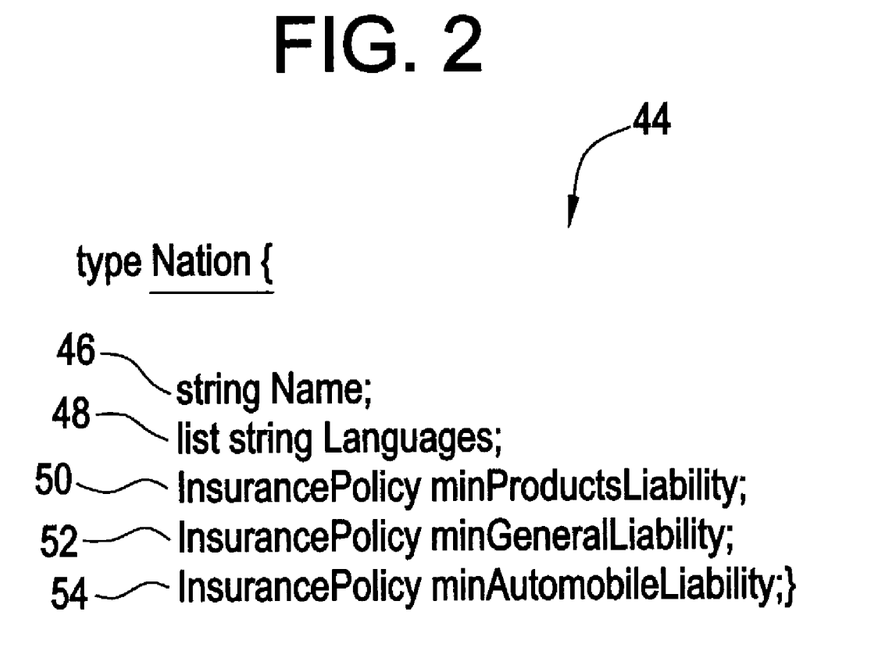
FIG. 2 is a block diagram of a data structure used in an embodiment of the present invention.

Referring now to FIG. 2, another data structure used in an embodiment of the present invention is disclosed. FIG. 2 is an example of a method of storing the information for a given nation in which the manufacturer, or any of its vendors, does business 44. In this embodiment of the present invention, a list of nations is present, so that the manufacturer can set its policies with respect to each individual country in which it does business. The Nation data type 44 contains the name of the nation 46, stored as a string, a character array, or any other data type that can be used to store, display, and manipulate alphanumeric data. The Nation data type also contains a list of the languages spoken by the residents of the nation 48.

Additionally, the Nation data type contains information regarding the insurance customs of the nation, and the manufacturer's requirements for policies of different types, or for different types of things purchased. One way to store this information can be to store an InsurancePolicy for each policy type that would constitute the manufacturer's minimum coverage requirements. For example, as shown in FIG. 2, the Nation data type could contain a minimum products liability policy 50, a minimum general liability policy 52, or a minimum automobile liability policy 54. Another way to set policies for each nation would be for the Nation data type to contain a standard policy that represents the minimum coverage for each type of policy, for each type of thing purchased.

Things purchased can include services provided by less-than-truckload, truckload, small parcel, or expedited common carriers who transport raw materials, finished goods, and incidental packages worldwide; plumbing services, electrician services, painting services, and other services that are necessary to ongoing worldwide operations. Further examples include professional services e.g., legal services, accounting services, health and safety consulting services, brokerage services, and rigger services, used on a worldwide basis. This embodiment of the present invention will allow electronic review of contractually required professional liability insurance and other required insurance. This review will ensure these professionals carry appropriate insurance to stand behind the services rendered and protect the manufacturer from unexpected liability arising out of the services provided.

Services of contractors who design, remodel, and build for the manufacturer on a worldwide basis, can be things purchased. This embodiment of the present invention will allow review of various liability insurance requirements usually contractually negotiated with these contractors. This review will allow the manufacturer to be assured that contractors are not in breach of contractual insurance obligations. If the manufacturer were to acquire a company, representations and warranties contained in the acquisition documents may require the seller to purchase various types of insurance for a period of time into the future. Here, the seller is a Vendor, and the company's assets are the ThingPurchased. This thing purchased requires insurance in a given set of Nations. This embodiment of the present invention will allow the manufacturer to track worldwide insurance compliance with contractual representations and warranties and take immediate and appropriate action if there is a breach of the insurance representations and warranties in a purchase agreement.

Manufacturers often give automobile allowances to employees or reimbursements to independent contractors. These employees and independent contractors use their personal vehicles for business. By law, the manufacturer's automobile liability insurance is excess insurance over the employee's or independent contractor's personal automobile insurance when the employee is driving within the scope of employment or the independent contractor is driving within the scope of the contract with the manufacturer. Here, the employee or independent contractor is a Vendor. If the employee or independent contractor does not purchase personal automobile insurance and is driving within the scope of employment or within the scope of the contract with the manufacturer, then the manufacturer's automobile liability insurance becomes primary insurance. This embodiment of the present invention will allow worldwide tracking of personal automobile liability insurance policies to ensure compliance with the manufacturer's policy and statutory obligations of employees and independent contractors using their personal vehicles for business. Tracking these personal automobile insurance policies will assist the manufacturer in avoiding unexpected liability.

The manufacturer may perform contracting work for third parties. Contractors sometimes use subcontractors in the course of their business endeavors. Contracts signed by these subcontracting vendors often require the subcontractor to carry certain insurance. This embodiment of the present invention will allow the manufacturer to track subcontractor insurance policies on a worldwide basis, thereby ensuring that subcontractors are not in breach of contractual insurance obligations. A breach of a subcontractor's contractual insurance obligations could unnecessarily expose the manufacturer to unexpected liability.

Figure 3:
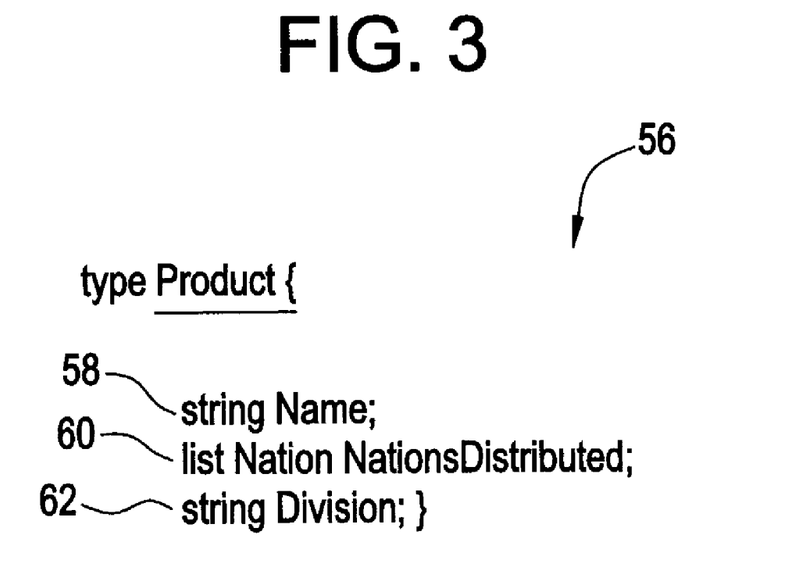
FIG. 3 is a block diagram of a data structure used in an embodiment of the present invention.

Referring now to FIG. 3, a data structure used in an embodiment of the present invention is disclosed. FIG. 3 is an example of the Products data structure 56, as used in an embodiment of the present invention. The manufacturer maintains a list of products, so that the products can be linked with the things provided by the vendor, and the vendor can, thus, be associated with the appropriate countries. Products can be stored in their own data type, so that all of the relevant information can be stored in the same place, independent of each particular vendor. The Product data type contains the product name 58, which can be stored as a string, a character array, or any other data type that can store, display, and manipulate alphanumeric data.

The Product data type also contains a list of all nations in which the product is sold or otherwise distributed 60. These can be stored as pointers to the list of Nations, stored in the Nations data type 44. This information is important so that vendors who contribute to the product carry the appropriate insurance in every country where the product is distributed. Because the information is tied to the product, and not the vendor, the manufacturer can update the product's distribution information only once, and the changes will track with the vendors, by virtue of the list of products in the vendor data type. Because the list of products in the vendor data type is stored as a list of pointers to entries in the products list, the vendors' countries are updated so long as the product list is updated. For example, if the manufacturer decides to sell a particular product in an additional country, that country will be added to the list of countries where the product is sold, and because each vendor supplying parts for that product has a pointer in his vendor data structure item to the product, the manufacturer will be able to know that the vendor is now required to carry insurance in that additional country. The product data structure can also contain any additional data with respect to the product that might be useful to the manufacturer, including, for example, the division of the manufacturer that produces that product 62.

Figure 4A:
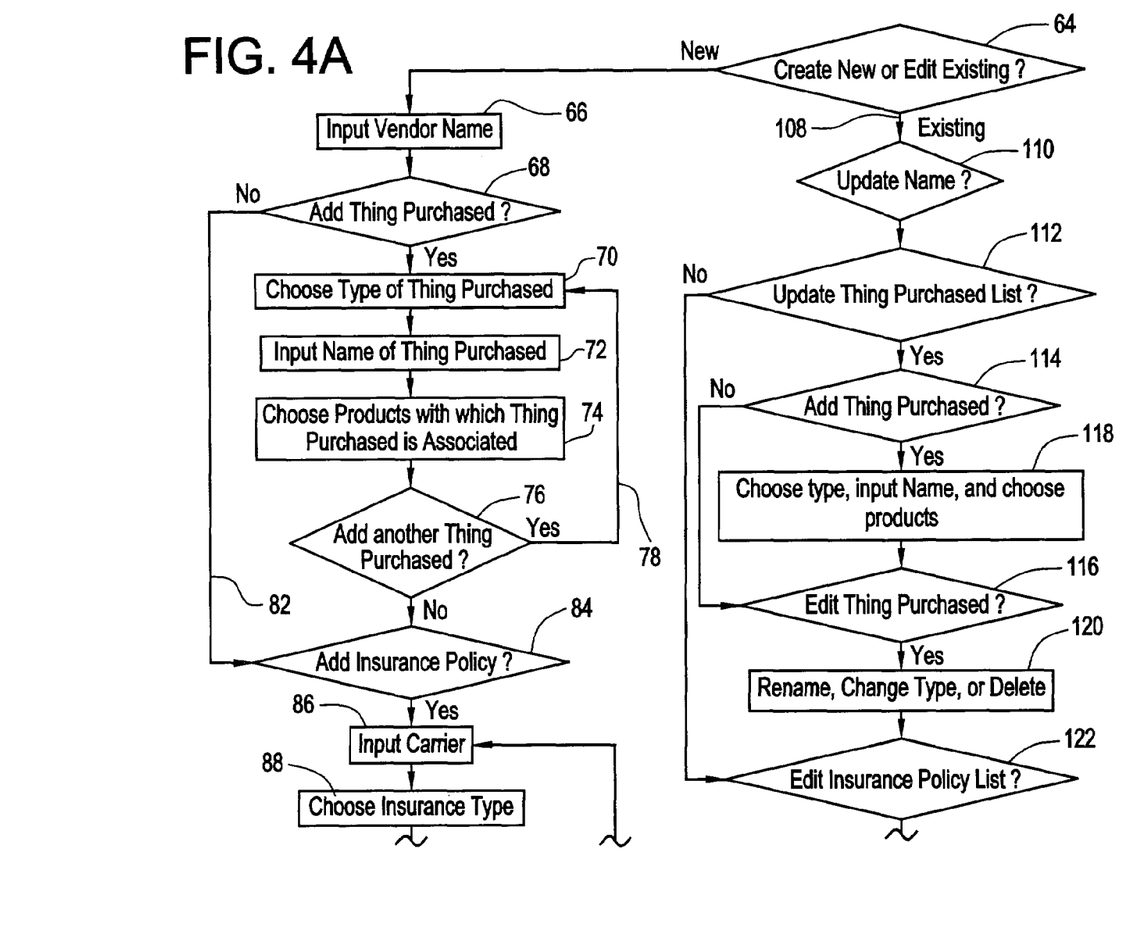
FIGS. 4A and 4B are two parts of a flow chart of a process used in an embodiment of the present invention.
Figure 4B:
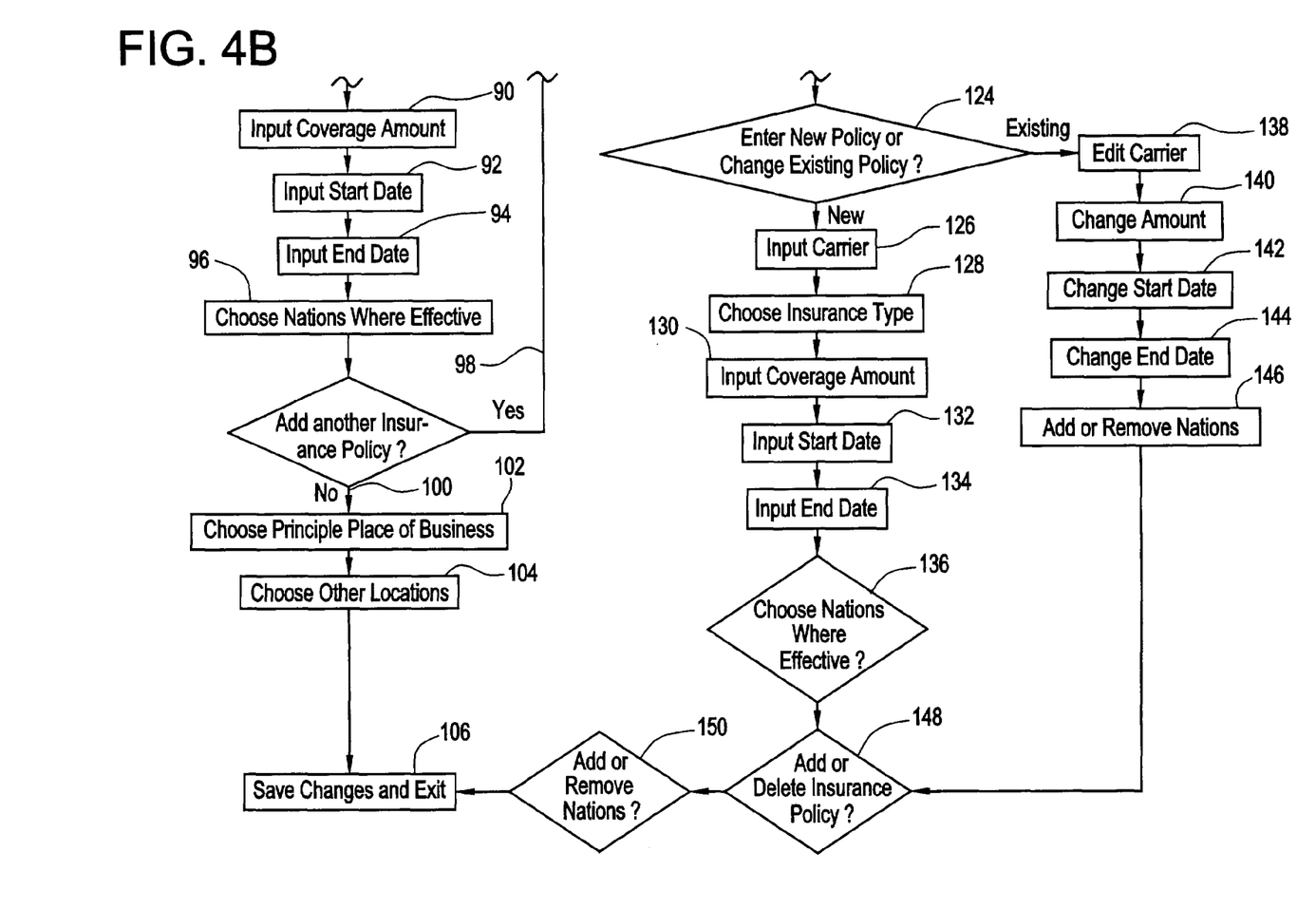

Referring now to FIGS. 4A and 4B, a flow chart indicating a sample method for updating the vendor list is disclosed. First, the person updating the Vendor list (the "user") would be asked whether he or she wanted to create a new vendor, or update an existing vendor 64. If the user wanted to create a new vendor, the user would be taken to the new vendor screen. Here, the user would be asked to input the name of the vendor 66. Next, the user would be asked whether he or she wanted to add an item to the list of things purchased 68. Each item in the list of things purchased are stored in the ThingPurchased data structure. The list of things purchased 14 is stored as part of the Vendor data structure 10. To update the list of things purchased, the user would be asked to choose a type of thing purchased from the list of types defined by the manufacturer 70. The user would also be asked to enter the name of the thing purchased 72. The user would be asked to choose all of the products with which the thing purchased is associated 74. The user would be asked if he or she wanted to enter another thing purchased for this vendor 76. If he or she did, he or she would be asked again to choose the type, enter the name, and choose the products 78. The user could continue this until the user no longer wants to add more things purchased 80.

When the user is finished entering things purchased 82, or if does not wish to enter things purchased, the user is asked whether he or she wants to add insurance policies for the vendor 84. If the user wishes to enter insurance policies, the user is then asked to input the carrier of the policy 86, and choose a type 88 and an amount of coverage 90. The insurance policy information is stored in the Policies member 24 of the Vendor data structure 10, which is a list of items having the InsurancePolicy type. The user is asked to input the start date 92 and end date of the policy 94. Finally, the user is asked to choose the nations in which the policy is effective, from the list of nations 96. The user is then asked if he or she wants to enter another insurance policy. If he or she does, he or she repeats the process 98. If he or she is finished entering insurance policies 100, he or she is asked to choose the primary location of the vendor, from the list of nations 102. Then, he or she is asked to choose other nations where the vendor is located from the list of nations 104. Finally, he or she saves the changes, and the new vendor is added to the list 106.

If the user chooses to edit the properties of an existing vendor 108, the user is asked whether he or she wants to update the name, the list of things purchased, the list of insurance policies, or the list of nations. If the user chooses to update the name, then he or she is asked to input the new name 110. If the user chooses to update the list of things purchased 112, he or she can choose add a new entry to the things purchased 114, or edit existing entries in the list of things purchased 116. If the user chooses to add an item to this list of things purchased, he or she is asked to choose the type of the thing purchased, input the name of the thing purchased, and choose the products with which the thing purchased is associated, from the list of products 118. If the user chooses to change an existing entry in the list of things purchased, he or she can choose to rename each thing purchased, change the type of any thing purchased, add or delete products from the list of products associated with the thing purchased, or delete the thing purchased from the list of things purchased 120. Information about things purchased are stored in the Purchased member 14 of the Vendor data type 10. The Purchased member 14 is a list of items having the ThingPurchased data type.

If the user chooses to update the list of insurance policies 122, he or she can choose to enter a new insurance policy 124, or edit existing entries in the list of insurance policies. If the user chooses to enter a new insurance policy, he or she is asked to enter the name of the carrier 126, choose the type of policy 128, enter the amount of coverage 130, enter the policy start date 132 and policy end date 134, and choose the nations covered under the policy, from the list of nations 136. If the user chooses to edit an exiting entry in the insurance policy list, he or she can choose to edit the name of the carrier 138, change the type of policy, change the amount of coverage 140, change the policy start date 142, change the policy end date 144, or add or remove nations covered from the list of nations 136. The user can also choose to delete an insurance policy from the list of insurance policies 148. If the user wants to update the list of nations where the vendor is located, he or she can choose to add or remove nations from the list of nations 150. Insurance policy information is stored in the Policies member 24 of the Vendor data type 10. the Policies member is a list of items having the InsurancePolicy data type. When the user has completed making changes, the changes are saved 106. This method can be performed at the site where the information is stored, or it can be done remotely over a distributed network, such as the Internet.

Figure 5:
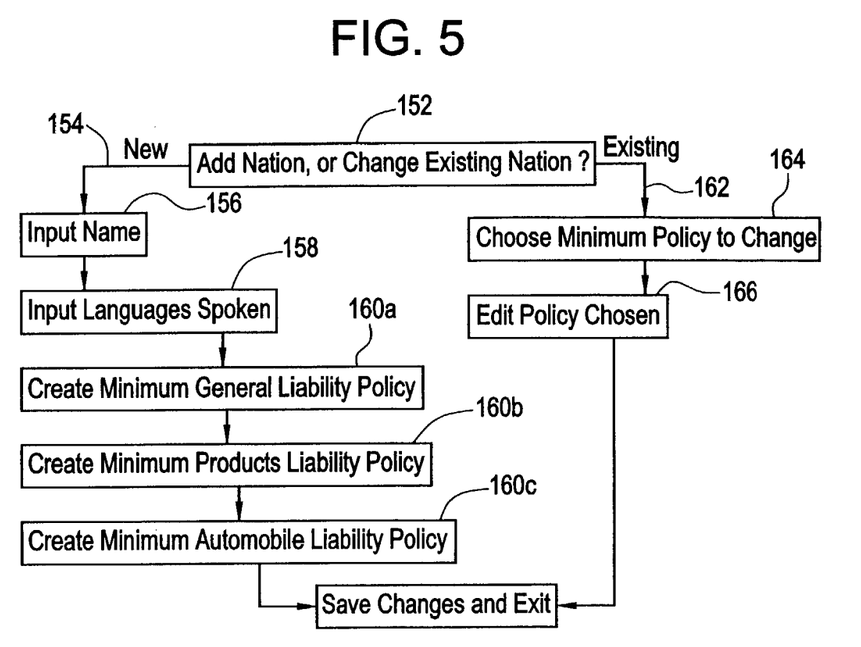
FIG. 5 is a flow chart of a process used in an embodiment of the present invention.

Referring now to FIG. 5, a flow chart indicating a sample method for updating the Nations list is disclosed. If the user wants to update the information regarding a particular nation, or add a nation to the list of nations in which the manufacturer does business, he or she can update the data using this method 152. If the user wishes to add a nation to the list of nations 154, the user will be asked to input the name of the nation 156, and input the languages spoken 158, create insurance policies that represent the minimum policies for each insurance type 160*a*-160*c*. If the Nation data type has any additional data information, such as insurance policies required for different types of things purchased, the user would enter that information. If the user wishes to change an existing nation 162, he or she will be asked to choose which minimum insurance policy he or she wants to edit 164, and will be given the opportunity to edit the attributes of that policy 166. This method can be performed at the site where the information is stored, or it can be done remotely over a distributed network, such as the Internet.

Figure 6:
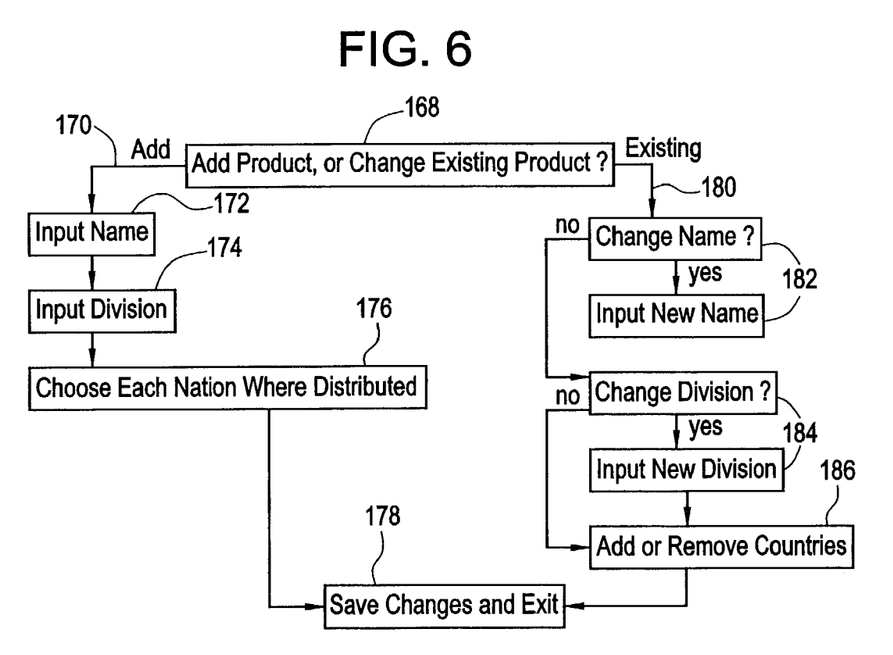
FIG. 6 is a flow chart of a process used in an embodiment of the present invention.

Referring now to FIG. 6, a flow chart indicating a sample method for updating the list of products is disclosed. Here, the user can update information regarding increased or decreased distribution for different products in the manufacturer's line. If the user chooses to edit the list of products, the user can choose to add a new product, or edit the properties of an existing product 168. If the user chooses to add a new product 170, the user will be asked to input the name of the product 170, and the division of the manufacturer that produces the product 174, if such information is stored in the Products data type. The user will then be asked to choose, from the list of nations, each nation in which the product is distributed 176. Once the user saves the information 178, the new product will be added to the list of products, and users will be able to update vendor information to reflect things purchased that are associated with the new product.

If the user chooses to modify an existing product in the products list 180, he or she can either change the name of the product 182, change the division information 184, or add or remove nations from the list of nations in which the product is distributed 186. Because items of the ThingPurchased data type, which are purchased from vendors stored in the Vendors data type, are associated, with pointers, to Products, the compliance status of every vendor who provides a good or service associated with a product is updated when the product information is updated, for example, to add or delete a nation from the list of nations in which the product is distributed. This method can be performed at the site where the information is stored, or it can be done remotely over a distributed network, such as the Internet.

Figure 7:
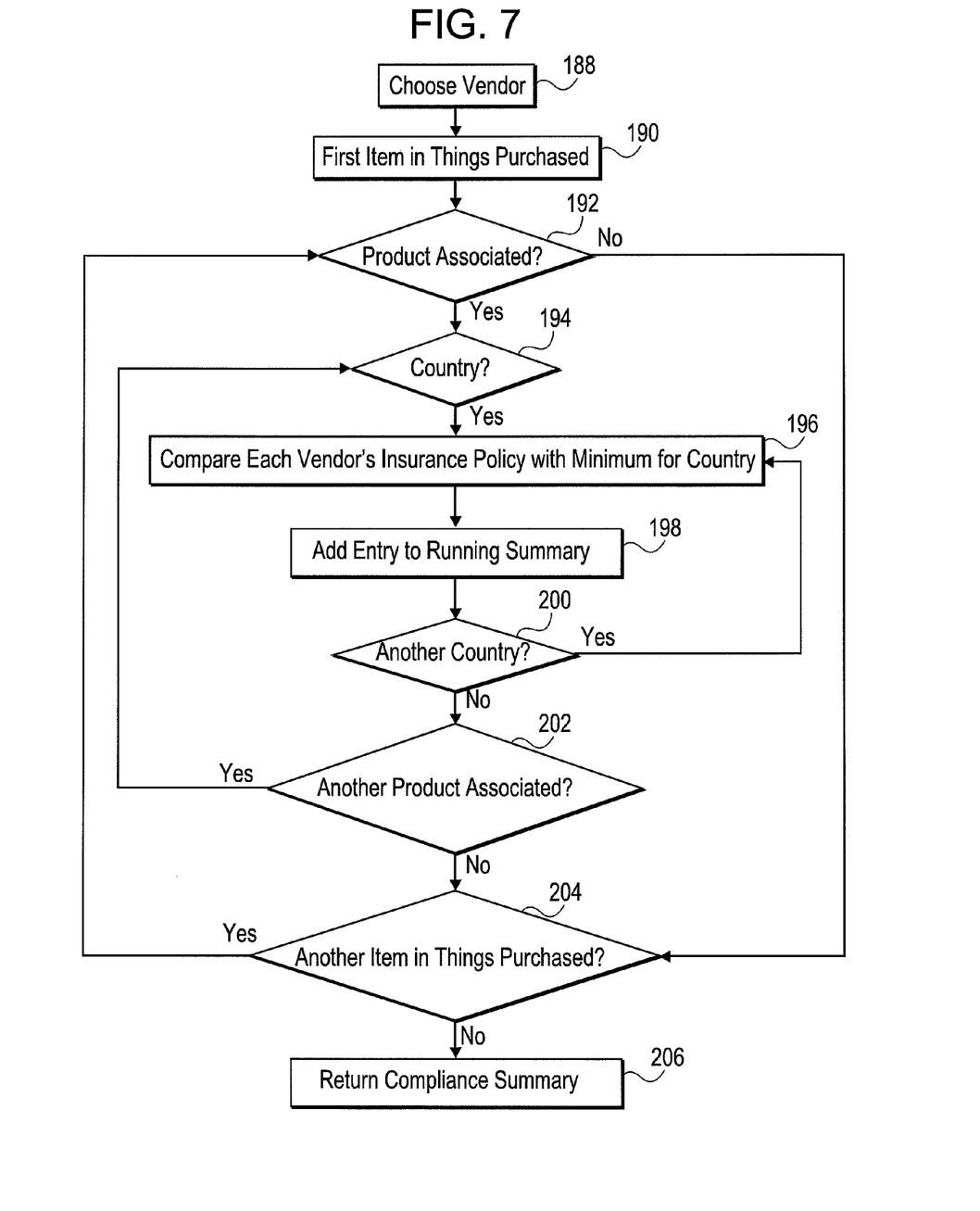
FIG. 7 is a flow chart of a process used in an embodiment of the present invention.

Referring now to FIG. 7, a flow chart indicating a test for automatic compliance is disclosed. First, the vendor whose compliance the user wishes to test is chosen. Next, for each item in the list of things purchased 190, each product with which the thing purchased is associated is examined 192. For each product, each nation in which the product is distributed is examined 194. For each nation, minimum insurance policy is compared with the insurance policy of that type associated with the vendor 196. If the insurance policy of that type meets the minimum, covers the nation in question, and is not expired, the vendor is in compliance with respect to that nation and that information is added to a running summary 198. The process is repeated for each nation where the product is distributed 200. When the nations for that product are exhausted, the next product associated with the thing purchased is examined, and each nation is compared with the vendor's insurance policies 196. When the products associated with the thing purchased are exhausted (202), the next thing purchased is examined 204. When the things purchased are exhausted, a summary is returned 206, that identifies the countries in which the vendor is not compliant, for which thing purchased, which is associated with which product. Thus, a vendor's international compliance can be determined. This method can be performed at the site where the information is stored, or it can be done remotely over a distributed network, such as the Internet.

Figure 8:
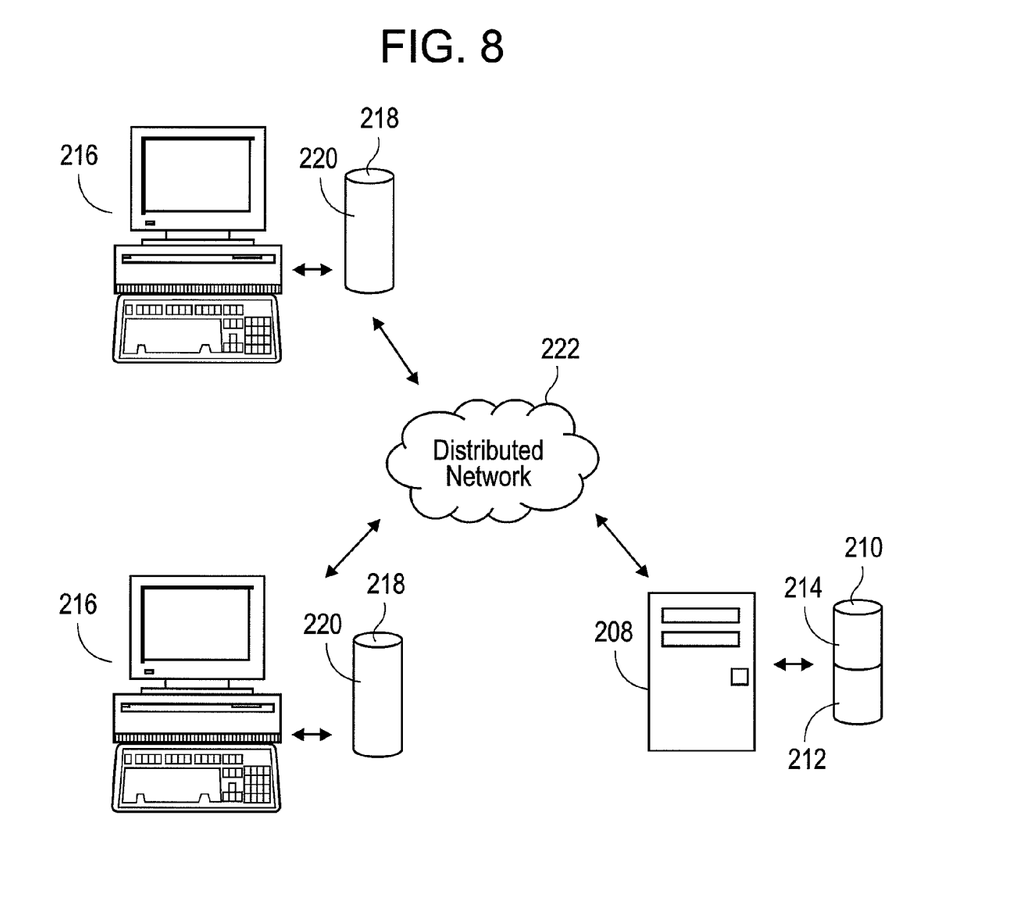
FIG. 8 is a is a block diagram of an apparatus in accordance with an embodiment of the present invention.

Referring now to FIG. 8, an exemplary communications apparatus and system embodying the present invention is disclosed. A general purpose computer 208, which plays the role of "server" in this embodiment of the present invention, contains a computer readable medium 210, which contains data 214 and program instructions 212. The program instructions 212 implement the methods described above, and any other methods required to implement the present invention. The data 214 contains the data structures described above, and any other data necessary to implement the present invention. The general purpose computer 208 is connected to a distributed network 222. The Internet is an example of a distributed network, but the distributed network 222 can be any other type of distributed network, including a LAN, a WAN, or a VPN.

A second general purpose computer 216 is also connected to the distributed network 222. The second general purpose computer 216 can be connected to the distributed network 222 directly, or through one or more gateway providers (not shown). This general purpose computer 216 can access the first general purpose computer 208, via the distributed network 222. The general purpose computer 216 contains a computer readable medium 218, which contains program instructions 220 necessary to implement remote viewing, querying, and updating of the information 214 stored on the computer readable medium 210 connected to the first general purpose computer 208. In an embodiment of the present invention, the general purpose computer 216 can contain program instructions that allow it to access only some of the information 214 on the computer readable medium 210 connected to the first general purpose computer 208. There can be multiple instances of general computer 216, each connected to the distributed network 222, directly or through gateway providers (not shown) and able to access some or all of the information 214 stored on the computer readable medium 210 of the first general purpose computer 208.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A method of insurance certificate tracking with a computer having a memory, the computer performing method steps of:

selecting a vendor via the computer from a vendor list stored on the memory, the vendor having an associated item list of items purchased and sold, a vendor country, and a vendor insurance policy, wherein the vendor country includes a country selected from a worldwide country list and the vendor list includes vendors from a multitude of nations;

modifying the vendor insurance policy via the computer in response to a national insurance custom associated with the vendor country, wherein the national insurance custom is an insurance practice that differs from a standard policy of the vendor country;

generating a product list via the computer, the product list including products associated with each item in the item list, wherein the vendor is tied to the product list via the item list associated with the vendor;

generating a country list via the computer, the country list including countries where each product of the product list is distributed;

accessing a minimum insurance policy for each country in the country list;

comparing the minimum insurance policy for each country in the country list with the modified vendor insurance policy via the computer; and generating an out of compliance list via the computer, the out of compliance list including countries the vendor is out of compliance with based on the comparison of the minimum insurance policy for each country in the country list with the modified vendor insurance policy.

2. The method of insurance certificate tracking according to claim 1, further comprising a step of:

generating an in compliance list via the computer, the in compliance list including countries the vendor is in compliance with based on the comparison of the minimum insurance policy for each country in the country list with the modified vendor insurance policy.

3. The method of insurance certificate tracking according to claim 1, further comprising a step of:

generating, via the computer, the national insurance custom associated with the vendor country.

4. The method of insurance certificate tracking according to claim 3, further comprising a step of:

generating an in compliance list via the computer, the in compliance list including countries the vendor is in compliance with based on the comparison of the minimum insurance policy for each country in the country list with the modified vendor insurance policy.

5. The method of insurance certificate tracking according to claim 1, further comprising a step of:

tracking personal automobile insurance policies, via the computer, for each employee of the vendor that uses their personal vehicle for vendor business.

6. The method of insurance certificate tracking according to claim 5, further comprising steps of:

determining, via the computer, if a personal automobile insurance policy for each employee of the vendor that uses their personal vehicle for vendor business plus a vendor supplied automobile insurance policy are in compliant with a minimum automobile insurance policy; and generating, via the computer, an out of compliance automobile insurance policy list of vendors having out of compliant automobile insurance policies based on the determination that the personal automobile insurance policy for at least one employee of the vendor plus the vendor supplied automobile insurance policy are out of compliance with the minimum automobile insurance policy.

7. The method of insurance certificate tracking according to claim 1, further comprising a step of:

adding, via the computer, a new vendor to the vendor list, the step of adding the new vendor including the steps of:

associating, via the computer, each item purchased by the new vendor added to the vendor list;

adding, via the computer, an address corresponding to the new vendor to the vendor list, the address including the new vendor country; and adding, via the computer, the vendor insurance policy of the new vendor to the vendor list.

8. The method of insurance certificate tracking according to claim 1, further comprising a step of:

generating, via the computer, the minimum insurance policy in response to the product list.

9. The method of insurance certificate tracking according to claim 1, further comprising a step of:

modifying, via the computer, the vendor insurance policy in response to the national insurance custom associated with each country in the country list.

10. A method of verifying insurance certificate compliance of a multinational set of vendors on a computer having a memory, the computer performing the method steps of:

accessing a vendor list stored on the memory, via the computer, each vendor of the vendor list having an associated item list of items purchased and sold, a vendor country, and a vendor insurance policy, wherein the vendor country includes a country selected from a worldwide country list and the vendor list includes vendors from a multitude of nations;

modifying, via the computer, the vendor insurance policy for each vendor in response to a national insurance custom associated with the vendor country, wherein the national insurance custom is an insurance practice that differs from a standard policy of the vendor country;

generating, via the computer, a product list of products associated with each item in the item list, wherein each vendor of the vendor list is tied to the product list via the item list associated with the respective vendor;

generating, via the computer, a country list of countries where each product of the product list is distributed;

accessing a minimum insurance policy for each country in the country list;

comparing, via the computer, the minimum insurance policy for each country in the country list with the modified vendor insurance policy; and generating, via the computer, an out of compliance list of countries the vendor is out of compliance with based on the comparison of the minimum insurance policy for each country in the country list with the modified vendor insurance policy.

11. The method of insurance certificate tracking according to claim 10, further comprising a step of:

generating, via the computer, an in compliance list of countries the vendor is in compliance with based on the comparison of the minimum insurance policy for each country in the country list with the modified vendor insurance policy.

12. The method of insurance certificate tracking according to claim 10, further comprising a step of:

generating, via the computer, the national insurance custom associated with the vendor country.

13. The method of insurance certificate tracking according to claim 12, further comprising a step of:

generating, via the computer, an in compliance list of countries the vendor is in compliance with based on the comparison of the minimum insurance policy for each country in the country list with the modified vendor insurance policy.

14. The method of insurance certificate tracking according to claim 10, further comprising a step of:

tracking, via the computer, personal automobile insurance policies for each employee of the vendor that uses their personal vehicle for vendor business.

15. The method of insurance certificate tracking according to claim 14, further comprising steps of:
   determining, via the computer, if a personal automobile insurance policy for each employee of the vendor that uses their personal vehicle for vendor business plus a vendor supplied automobile insurance policy are in compliant with a minimum automobile insurance policy; and
   generating, via the computer, an out of compliance automobile insurance policy list of vendors having out of compliant automobile insurance policies based on the determination that the personal automobile insurance policy for at least one employee of the vendor plus the vendor supplied automobile insurance policy are out of compliance with the minimum automobile insurance policy.

16. The method of insurance certificate tracking according to claim 10, further comprising a step of:
   adding, via the computer, a new vendor to the vendor list, the step of adding the new vendor including the steps of:
      associating, via the computer, each item purchased by the new vendor added to the vendor list;
      adding, via the computer, an address corresponding to the new vendor to the vendor list, the address including the new vendor country; and
      adding, via the computer, the vendor insurance policy of the new vendor to the vendor list.

17. The method of insurance certificate tracking according to claim 10, further comprising a step of:
   generating, via the computer, the minimum insurance policy in response to the product list.

18. The method of insurance certificate tracking according to claim 10, further comprising a step of:
   modifying, via the computer, the vendor insurance policy in response to the national insurance custom associated with each country in the country list.

* * * * *